No. 704,755. Patented July 15, 1902.
G. ORTH.
AUTOMATIC SHUTTER SETTING MECHANISM.
(Application filed Jan. 15, 1901.)

(No Model.) 2 Sheets—Sheet 2.

Witnesses:
Emil Dinitz
Paul Krüger

Inventor:
Georg Orth.

UNITED STATES PATENT OFFICE.

GEORG ORTH, OF JENA, GERMANY, ASSIGNOR TO THE FIRM CARL ZEISS, OF JENA, GERMANY.

AUTOMATIC SHUTTER-SETTING MECHANISM.

SPECIFICATION forming part of Letters Patent No. 704,755, dated July 15, 1902.

Application filed January 15, 1901. Serial No. 43,427. (No model.)

*To all whom it may concern:*

Be it known that I, GEORG ORTH, technicist, a subject of the King of Prussia, German Emperor, residing at Carl Zeiss strasse, Jena, in the Grand Duchy of Saxe-Weimar, German Empire, have invented a new and useful Automatic Shutter-Setting Mechanism, of which the following is a specification.

The invention is applicable to photographic cameras fitted with safety-shutters—i. e., shutters which can after exposure be brought back to their former position without the necessity of obviating exposure by the use of objective cover or slide, as the exposure-slit (or the like) of the shutter is automatically covered over before it repasses the opening. For shutters answering this description the invention provides a winding mechanism which acts automatically after each exposure. Its principal working part is a mainspring which after being wound up acts by a series of partial movements corresponding to the number of successive releasements until its energy is exhausted. A special member connected with the shutter releases the mainspring as soon as the shutter is completing its running-down movement. The mainspring stands in connection with the winding mechanism, which after the mainspring has been released couples itself to the shutter by means of a tappet contrivance. A special catch or release mechanism is provided for the shutter, the tappet being released by a fixed stop as soon as the shutter has been caught and then the mainspring being locked. The mainspring may be connected with the film-winding mechanism, (or with the mechanism for changing the plates,) so that a renewal of the surface to be exposed takes place simultaneously with the setting of the shutter. This arrangement enables the operator to take several photographs in succession by simply releasing the shutter repeatedly.

The accompanying drawings show an automatic setting device for safety-shutters constructed according to the invention. A focal blind-shutter is supposed to be used in a roll-holding camera, the mainspring of the setting mechanism being shown connected with the mechanism for winding the film.

Figures 1, 3, 4, 5:
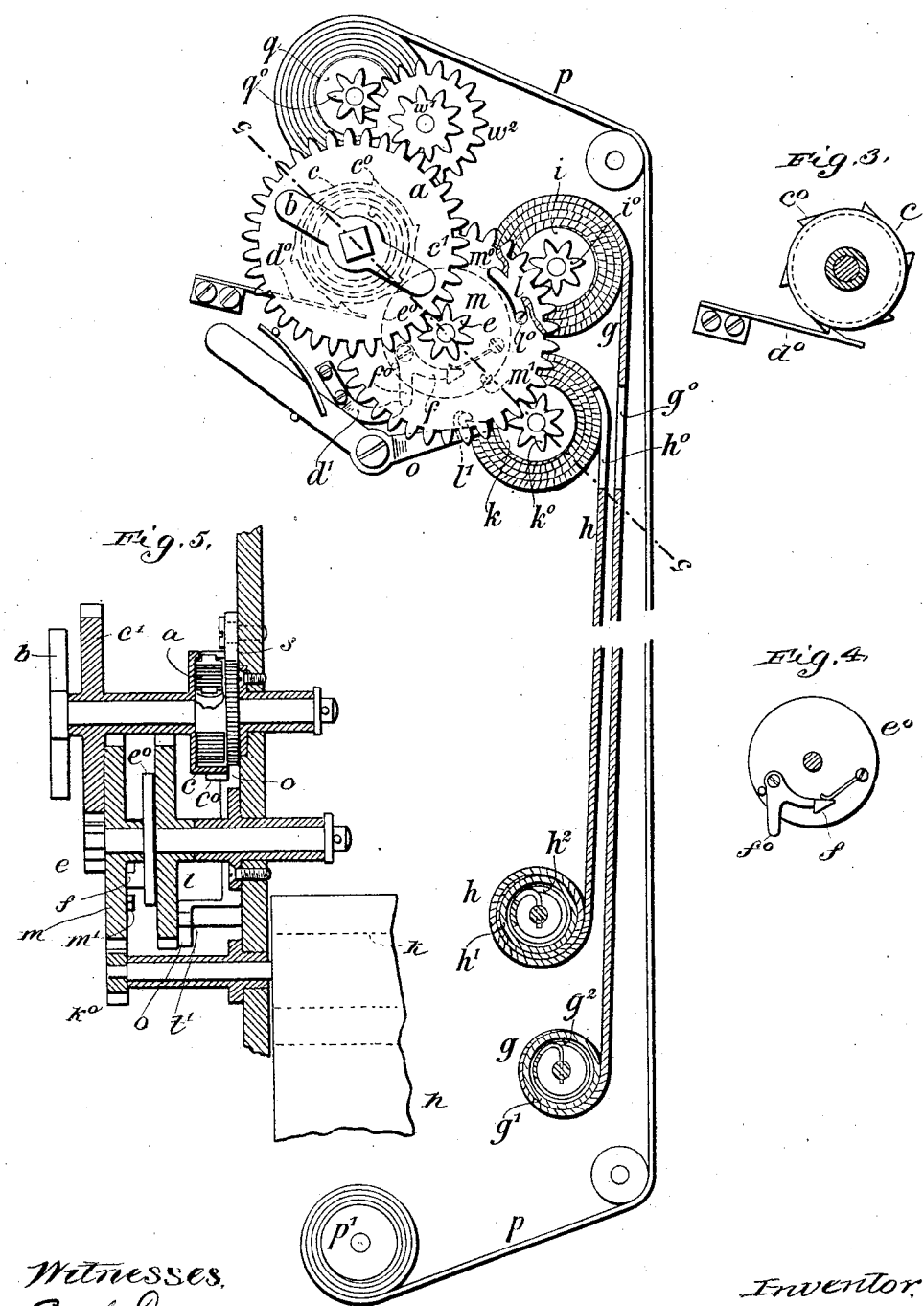
Figure 2:
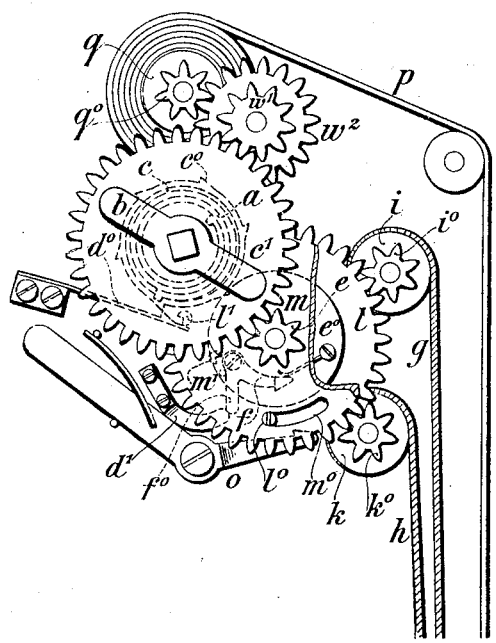
Figure 2:
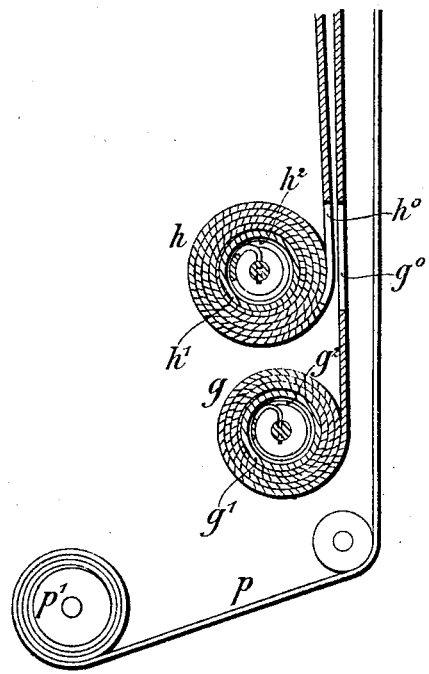

Figure 1 represents the setting device with the shutter in the set position. Fig. 2 shows the shutter run down and the mainspring already released for resetting. A few parts which cannot be clearly distinguished in Figs. 1 and 2 are shown in Figs. 3 and 4. Fig. 5 is a section on the line 5 5 in Fig. 1.

It may be observed that for the sake of clearness all parts which are rigidly connected together are designated by the same reference-letter and are only distinguished from each other by exponential numerals.

The mainspring $a$ is at its inner end connected with the winder, of which only the handle $b$ (always to be turned to the left) appears in Figs. 1 and 2, the ratchet-wheel $r$ and pawl $s$ being shown in Fig. 5. The outer extremity of the spring is secured to the barrel $c$, Fig. 3. The six teeth $c^0$, distributed over the circumferential surface of the barrel, are caught successively by the release-pawl $d^0$.

The setting mechanism proper consists of the spur-wheel $c'$, attached to the barrel $c$, a small pinion $e$ in gear with it, and a spring-pressed pawl $f$. This pawl is pivoted upon a disk $e^0$, Fig. 4, which is rigidly connected with the pinion $e$. A finger-shaped projection $f^0$ of the pawl is designed to come in contact with the stop $d'$, Figs. 1 and 2, fixed to the outer case. The pawl $f$ is the tappet device. It catches up the shutter mechanism so as to set it. Figs. 1 and 2 represent the pawl $f$ out of action in consequence of the fixed stop $d'$ engaging with the arm $f^0$ and the latter in the act of slipping over $d'$. Each sixth of a revolution of the barrel $c$ causes one complete revolution of the disk $e^0$.

The shutter consists of two roller-blinds $g$ and $h$, having slits $g^0$ and $h^0$. The upper ends of these blinds are fastened on spools $i$ and $k$, which unwind in exposure, and their lower ends are fastened on spools $g'$ and $h'$, which are provided with the usual springs $g^2$ and $h^2$ for winding up the blinds when the shutter is released. Spool $i$ of blind $g$ carries a pinion $i^0$, which engages with a spur-wheel $l$, loosely mounted on the axle of pinion $e$. Another spur-wheel $m$, rotatable on the same axis, engages with a pinion $k^0$, carried by the spool $k$ of the blind $h$. The spur-wheel $m$ has cut into it a slot $m^0$, which serves as a stop in combination with a pin $l^0$ on the wheel $l$. When the shutter is ready set, as shown in Fig. 1, blind $g$ is held by the release-lever $o$ being in contact with the pin $l'$ of wheel $l$ and blind $h$ is suspended, so to speak, from blind $g$ by the connecting means just described.

The operation is as follows: On releasing the lever $o$ both blinds move downward simultaneously and maintaining their relative position any accidental interruption of the contact between the extremity of slot $m^0$ and the pin $l^0$ being obviated by the spring $h^2$ of blind $h$ having a slightly-greater power than the spring $g^2$ of blind $h$. The movement of the blinds is arrested after exposure by pin $l'$ coming in contact with the spring-pawl $d^0$, which is thereby displaced, so as to release the barrel. Then the position of all parts of the mechanism is that shown in Fig. 2. The barrel $c$ now begins its movement together with the plate $e^0$ and soon the tappet-pawl $f$ catches the pin $m'$ on the wheel $m$ and carries the latter along. Thereby only blind $h$ is raised till the opposite end of the slot $m^0$ comes against the pin $l^0$. This separate movement of blind $h$ closes the exposure-aperture formed by the coincidence of the slits $g^0$ and $h^0$. When the other extremity of slot $m^0$ has reached pin $l^0$, wheel $l$ is likewise taken along. Both blinds then participate in the remainder of the return movement, which continues till by the contact between the arm $f^0$ and the fixed stop $d'$ the tappet-pawl $f$ is lifted clear of the pin $m'$, so that both blinds are free to run down; but now the release-pawl $o$ catches the pin $l'$, and thereby secures blind $g$ at its highest position. Blind $h$ recedes by the same amount by which at the beginning of the upward movement it had traveled in advance of blind $g$, for it recedes till the other end of slot $m^0$ strikes the pin $l^0$ on the arrested wheel $l$. The action described takes place after each release of pawl $o$, and the mechanism will remain effective till the energy given to the mainspring by winding it up becomes exhausted. For the purpose of winding over the film $p$ from spool $p'$ to spool $q$ at least the length of a picture simultaneously with the setting of the shutter the barrel $c$ is connected by the wheels $c'$, $w'$, and $w^2$ with the pinion $q^0$ of the film-spool $q$. When, therefore, the barrel commences the movement already described, it winds at the same time the film $q$ on its spool.

What I claim as my invention, and desire to secure by Letters Patent, is—

1. The combination with a safety-shutter, of a mainspring, means for winding up this spring, a pawl-and-ratchet mechanism enabling the mainspring to be released and caught again after only a partial unwinding movement, a release member connected with the shutter so as to move therewith and adapted to act on the release-pawl of the mainspring, when the shutter has done its exposure work, and a tappet device, which transmits the action of the mainspring to the shutter so as to set the same, essentially as described.

2. The combination with a safety-shutter of a mainspring, means for winding up this spring, a pawl-and-ratchet mechanism enabling the mainspring to be released and caught again after only a partial unwinding movement, a release member connected with the shutter so as to move therewith and adapted to act on the release-pawl of the mainspring, when the shutter has done its exposure work, a tappet device, which transmits the action of the mainspring to the shutter so as to set the same, a mechanism for changing the photographic surface and a connection between this mechanism and the mainspring securing the change of the said surface during each unwinding movement of the mainspring.

In testimony whereof I have signed my name to this specification in the presence of two subscribing witnesses.

GEORG ORTH.

Witnesses:
EMIL DÖNITZ,
PAUL KRÜGER.